United States Patent
Hanson (10) Patent No.: US 12,510,274 B2
(45) Date of Patent: Dec. 30, 2025

(54) CONTROLLED CLEARING OF REFRIGERANT ORIFICE

(71) Applicant: Robert Bosch GmbH, Stuttgart (DE)

(72) Inventor: Jacob Hanson, Owatonna, MN (US)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 18/512,440

(22) Filed: Nov. 17, 2023

(65) Prior Publication Data
US 2025/0164165 A1   May 22, 2025

(51) Int. Cl.
*F25B 45/00* (2006.01)

(52) U.S. Cl.
CPC ........ *F25B 45/00* (2013.01); *F25B 2345/002* (2013.01)

(58) Field of Classification Search
CPC ............. F25B 45/00; F25B 2345/002; F25B 2345/001; F25B 2345/0052; F25B 2345/006
See application file for complete search history.

(56) References Cited

U.S. PATENT DOCUMENTS

| 6,202,433 | B1 | | 3/2001 | Murray et al. |
| 2009/0188271 | A1 | * | 7/2009 | McMasters ........ B60H 1/00585 |
| | | | | 62/468 |
| 2016/0187042 | A1 | * | 6/2016 | Brown .................... F25B 45/00 |
| | | | | 62/77 |

FOREIGN PATENT DOCUMENTS

| EP | 3162598 B1 | * | 12/2019 | .............. F25B 45/00 |
| JP | 2004116929 A | * | 4/2004 | |

* cited by examiner

*Primary Examiner* — Kun Kai Ma
(74) *Attorney, Agent, or Firm* — David Kovacek; Maginot, Moore & Beck LLP (57) ABSTRACT

A method of clearing an orifice of a fluid conduit for refrigerant within an air conditioning service device. The method comprises establishing a pressure gradient between a branch of fluid conduit comprising the orifice and the external atmosphere and utilizing the pressure gradient to flush air through the orifice. The flow of air between the orifice and the fluid conduit is controlled to minimize introduction of unwanted air to the air condition service device.

20 Claims, 6 Drawing Sheets

CONTROLLED CLEARING OF REFRIGERANT ORIFICE

TECHNICAL FIELD

This disclosure relates to routine operations of air conditioning service carts. In particular, this disclosure is directed to service carts utilized during service and maintenance of air conditioning systems of vehicles.

BACKGROUND

Air conditioning (AC) service carts may be required by regulation to sample and identify refrigerant used in vehicle systems during a recovery phase of service, wherein refrigerant is captured from the vehicle's AC circuit into the service cart. The refrigerant is pulled through a protective orifice before being delivered to an identifier. The protective orifice is utilized to protect the identifier and ensure optimal purity of the refrigerant during identification. The fluid pathways of the service cart and vehicle also contain small amounts of oil in order to protect and prolong operation of the internal components of both the vehicle and the service cart. The oil is more viscous than refrigerant, and over regular use of the service cart the protective orifice can become clogged with oil or residue. The protective orifice is not designed to be user-serviceable so as to preserve the integrity of its protective features, which prevents contamination or damage to the identifier. What is desired is a routine way of operating the service cart that can minimize the potential clogging of the protective orifice caused by oil or residue within the fluid pathways of the service cart and vehicle.

SUMMARY

One aspect of this disclosure is directed to a refrigerant exchange method. The method comprises establishing fluid communication between a service cart and a refrigerant circuit of a vehicle, the fluid communication comprising a high-side connection and a low-side connection. The method further comprises lowering the fluid pressure within the fluid communication such that refrigerant within the refrigerant circuit is directed toward a reservoir of the service cart for a recovery process. The method further comprises opening a solenoid associated with a refrigerant identification (RID) branch of the service cart a predetermined plurality of times while the refrigerant circuit experiences lowered fluid pressure during the recovery process. The method additionally comprises closing the solenoid after a predetermined window of time for each of the plurality of opening actions of the solenoid. The predetermined plurality of opening actions and the predetermined windows of time are selected to purge an orifice associated with the RID branch. In some embodiments the solenoid may be subjected to between 2 and 5 opening actions. In some embodiments, one or more open actions may comprise a predetermined window of time of a duration between 3 and 7 seconds.

Another aspect of this disclosure is directed to a refrigerant exchange method. The method comprises establishing fluid communication between a service cart and a refrigerant circuit of a vehicle, the fluid communication comprising a high-side connection and a low-side connection. The method further comprises lowering the fluid pressure within the fluid communication such that refrigerant within the refrigerant circuit is directed toward a reservoir of the service cart for a recovery process. The method additionally comprises opening a solenoid associated with a refrigerant identification (RID) branch of the service cart while the refrigerant is recovering into the reservoir for a first window of time, such that the RID branch the service cart accumulates a sample quantity of refrigerant, and closing the solenoid after the sample has been identified or assessed for purity. The method further comprises opening the solenoid a predetermined plurality of times while the refrigerant circuit experiences lowered fluid pressure during the recovery process and closing the solenoid after a predetermined window of time for each of the plurality of opening actions of the solenoid. The method further comprises establishing a pressure differential between the service cart and the refrigerant circuit such that refrigerant is directed toward the refrigerant circuit of the vehicle from the reservoir in a recharge process. The method additionally comprises discontinuing the pressure differential after a quantity of refrigerant specified for the vehicle has been recharged into the refrigerant circuit from the reservoir. The predetermined plurality of opening actions and the predetermined windows of time are selected to purge an orifice associated with the RID branch. In some embodiments the solenoid may be subjected to between 2 and 5 opening actions. In some embodiments, one or more open actions may comprise a predetermined window of time of a duration between 3 and 7 seconds.

A further aspect of this disclosure is directed to a non-transitory computer-readable medium having instructions stored thereon that when executed by a processor cause the processor to perform the steps of a refrigerant exchange method. The method comprises establishing fluid communication between a service cart and a refrigerant circuit of a vehicle, the fluid communication comprising a high-side connection and a low-side connection. The method further comprises lowering the fluid pressure within the fluid communication such that refrigerant within the refrigerant circuit is directed toward a reservoir of the service cart for a recovery process. The method additionally comprises opening a solenoid associated with a refrigerant identification (RID) branch of the service cart while the refrigerant is recovering into the reservoir for a first window of time, such that the RID branch the service cart accumulates a sample quantity of refrigerant, and closing the solenoid after the sample has been identified or assessed for purity. The method further comprises opening the solenoid a predetermined plurality of times while the refrigerant circuit experiences lowered fluid pressure during the recovery process and closing the solenoid after a predetermined window of time for each of the plurality of opening actions of the solenoid. The method further comprises establishing a pressure differential between the service cart and the refrigerant circuit such that refrigerant is directed toward the refrigerant circuit of the vehicle from the reservoir in a recharge process. The method additionally comprises discontinuing the pressure differential after a quantity of refrigerant specified for the vehicle has been recharged into the refrigerant circuit from the reservoir. The predetermined plurality of opening actions and the predetermined windows of time are selected to purge an orifice associated with the RID branch. In some embodiments the solenoid may be subjected to between 2 and 5 opening actions. In some embodiments, one or more open actions may comprise a predetermined window of time of a duration between 3 and 7 seconds.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
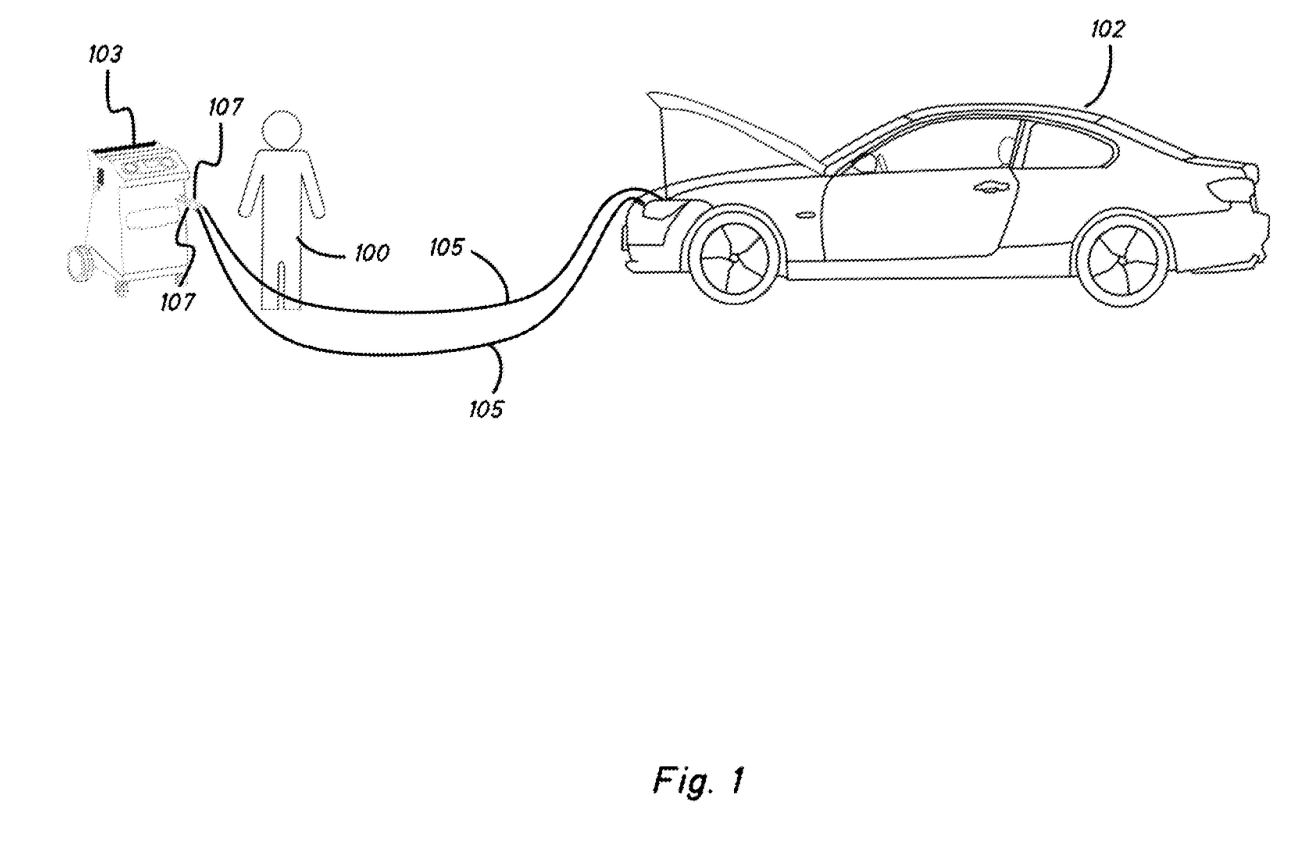
FIG. 1 is an illustration of a vehicle and service cart during a service action for an air conditioning system of the vehicle.

FIG. 1 depicts a typical use case of a user 100 performing a fluid exchange operation for a vehicle 102 using a service cart 103. In the depicted embodiment, the fluid exchange operation of service cart 103 is directed to the air conditioning system of vehicle 102, but other embodiments may be directed to other fluid exchange services without deviating from the teachings disclosed herein. In the depicted embodiment, refrigerant is moved between the vehicle 102 and service cart 103 via a number of hoses 105 that are coupled at one end to vehicle 102 and at the other end to service cart 103. Each of the hoses 105 are coupled to service cart 103 via a hose connector assembly 107 in an assembled state.

Figure 2:
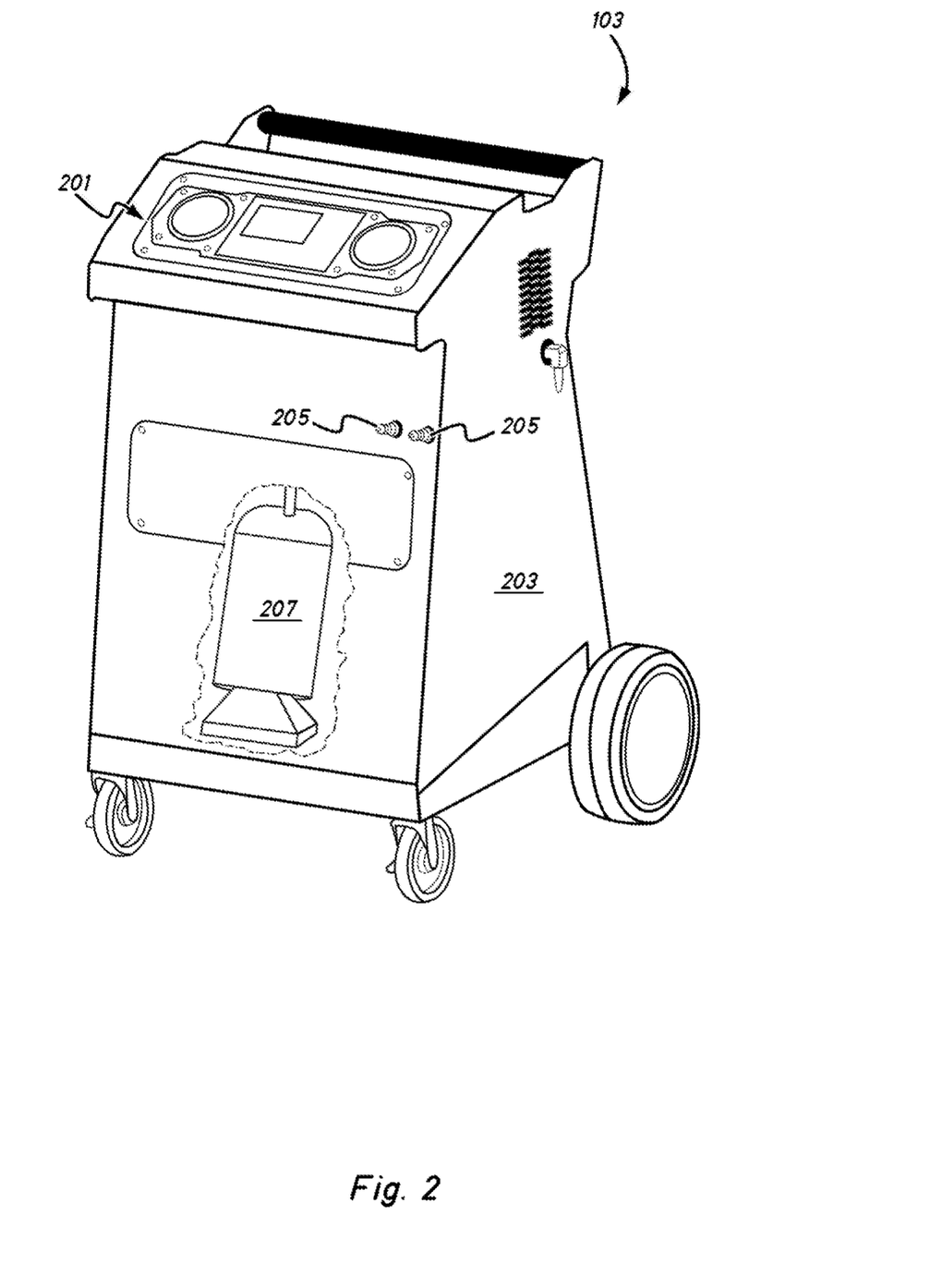
FIG. 2 is an illustration of an air conditioning service cart.

FIG. 2 depicts service cart 103 and components thereof. Service cart 103 comprises a console 201 providing a user with displays and controls for the functions of service cart 103. The chassis 203 of service cart 103 provides support for a number of ports 205 which provide fluid communication with a storage tank 207 at least partially disposed within chassis 203. In the depicted embodiment, ports 205 comprises a high-side port and a low-side port conventional to exchange refrigerant between a vehicle (such as vehicle 102; see FIG. 1) and service cart 103, but other embodiments may comprise other configurations without deviating from the teachings disclosed herein. During service, service cart 103 is operable to transfer refrigerant to and from the vehicle and storage tank 207 via ports 205. This transfer is accomplished utilizing pressure differentials within conduits exhibiting fluid communication between refrigerant circuits of the vehicle under service and also service cart 103.

Figure 3:
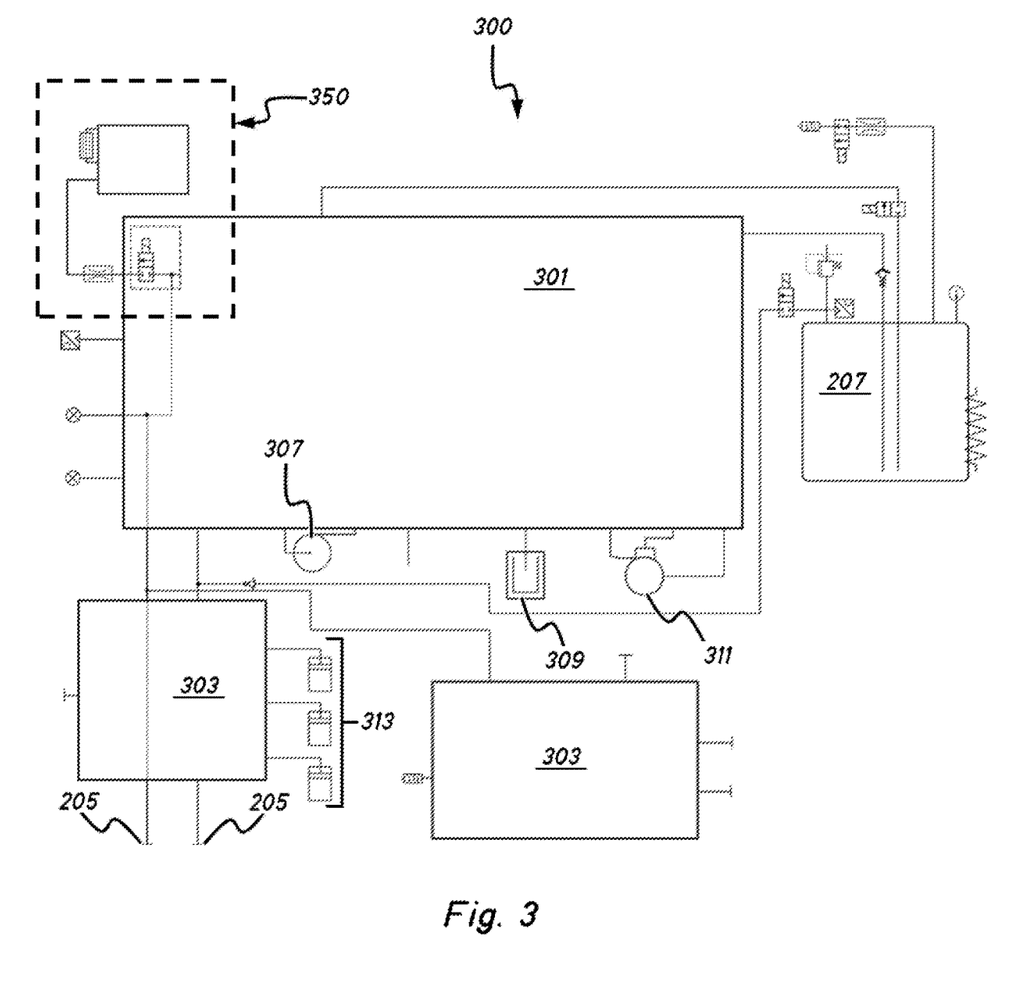
FIG. 3 is a diagrammatic illustration of a refrigerant flow circuit of a service cart.

FIG. 3 is a simplified diagrammatic view of a representation of a refrigerant circuit 300 of a service cart (such as service cart 103; see FIG. 1, FIG. 2). Circuit 300 comprises a main manifold 301, a flush manifold 303, and an injection manifold 305. Circuit 300 further comprises a vacuum pump 307 suitable for generating pressure differentials within the fluid channels of circuit 300. Circuit 300 further comprises an oil drain receptacle 309. Circuit 300 further comprises a compressor 311 suitable for inducing state changes in refrigerant, and also inducing motion of refrigerant within the circuit 300 in at least one direction. Vacuum pump 307 may be utilized to create pressure differentials that cause refrigerant to flow into or out of storage tank 207 (see also FIG. 2) with respect to other portions of circuit 300, or with additional respect to external devices in fluid communication with circuit 300 (e.g., the refrigerant circuit of an air conditioning system of a vehicle, such as vehicle 102; see FIG. 1). Compressor 311 may additionally induce motion of refrigerant to or from storage tank 207 with respect to other portions of circuit 300, or with additional respect to external devices in fluid communication with circuit 300 (e.g., the refrigerant circuit of an air conditioning system of a vehicle, such as vehicle 102; see FIG. 1).

Circuit 300 comprises additional features, including a portion thereof considered to be a refrigerant identification (RID) branch 350. RID branch 350 is in fluid communication with conduits of circuit 300 that lead to storage tank 207 and at least one of ports 205. RID branch 350 is utilized during service operations of the circuit to perform requisite sampling and identification functions of refrigerant in use by a vehicle subjected to the service operation. This sampling and identification process is necessary to ensure the proper refrigerant is being utilized as specified by a manufacturer of a vehicle, ensure a minimum purity of the refrigerant being used by the vehicle during the service operation, and to ensure compliance with any local regulatory requirements of the service operation.

The sampling and identification of refrigerant is normally accomplished during the recovery phase of a service operation. For the purposes of this disclosure, "recovery" refers to the process of transferring refrigerant from the air conditioning circuit of a vehicle and into storage tank 207. During recovery, vacuum pump 307 reduces the internal pressure of the fluid conduits of circuit 300 while the vehicle's air conditioning circuit is in fluid communication with ports 205. The resulting pressure differential causes the transfer of refrigerant to initiate. As refrigerant transfers into storage tank 207, some portion of the refrigerant recovered will necessarily pass by RID branch 350 en route to storage tank 207. Permitting the refrigerant to flow into RID branch 350 during recovery permits sampling and identification of the refrigerant by elements of RID branch 350.

Figure 4:
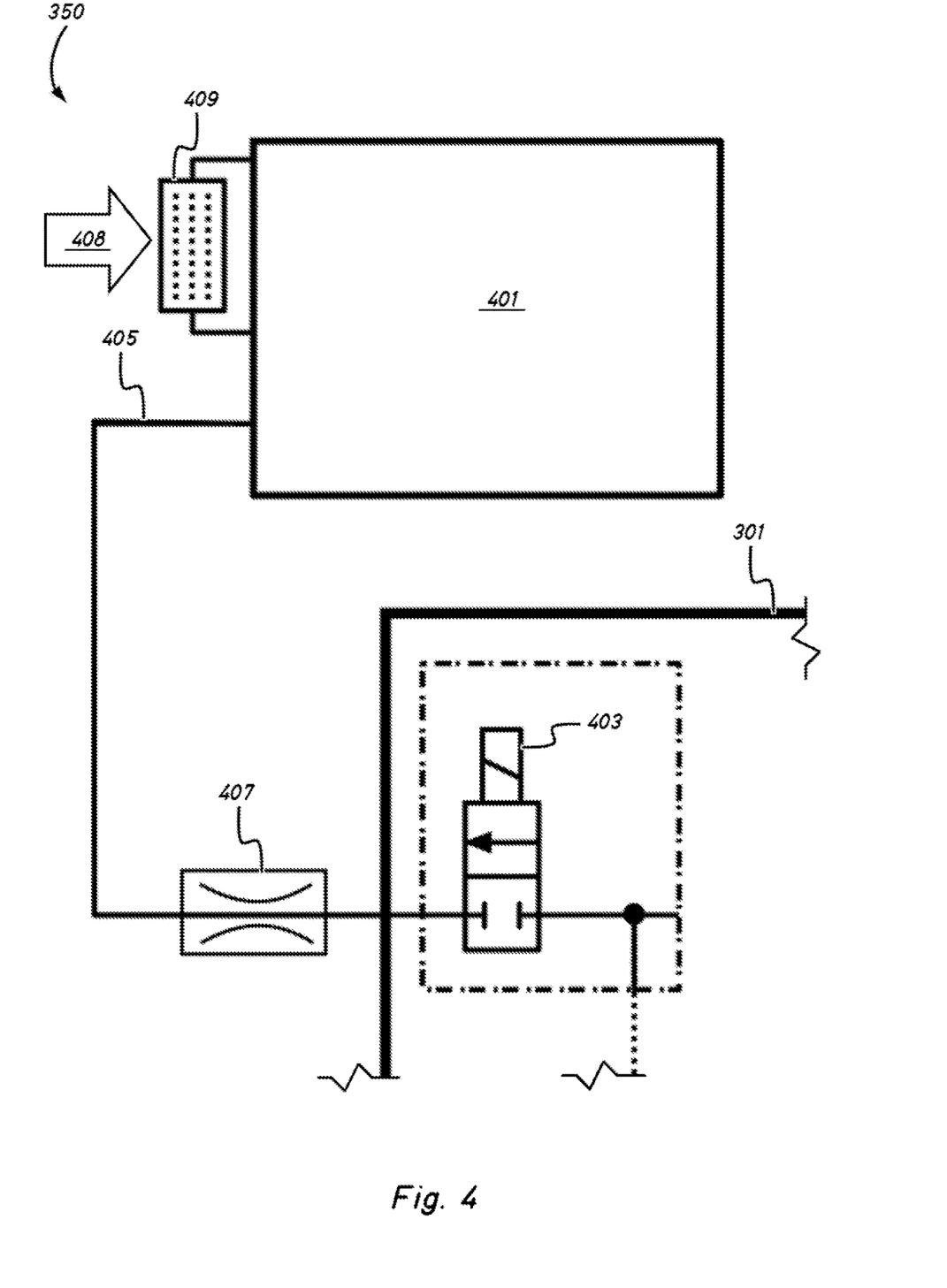
FIG. 4 is a diagrammatic illustration providing additional close-up details to a refrigerant identification branch of the refrigerant flow circuit of FIG. 3.

FIG. 4 is a close-up diagrammatic of the elements of the RID branch 350. RID branch 350 comprises a refrigerant identifier (RID) 401. RID 401 comprises a combination of fluid collection and chemical analysis components to provide an identification of refrigerant and assess the purity thereof. Refrigerant is permitted to pass into RID branch 350 via activation of an RID solenoid 403, which can normally be sealed to optimize transfer of refrigerant within main manifold 301 when no sample is needed for the service operation. When solenoid 403 is opened, refrigerant can pass from main manifold 301 to RID 401 via an RID conduit 405. In the depicted embodiment, RID conduit 405 comprises gas-tight tubing, but other embodiments may comprise other constructions without deviating from the teachings disclosed herein.

Because sampling and identification occurs during recovery, the pressure inside main manifold 301 is still close to a vacuum, and the sample of refrigerant can be expelled from RID 401 through a pressure gradient between RID 401 and main manifold 301. The pressure gradient pulls refrigerant out of the RID branch 350 when solenoid 403 remains open.

The fluid conduits of the service cart will house therein materials other than refrigerant. In addition to impurities and debris that may transfer into the fluid conduits from the vehicle during recovery, the fluid conduits also contain a specified amount of oil to protect and preserve the internal components of the service cart 103, such as solenoids (including solenoid 403), check valves, fittings, gaskets, or other components that utilize oil to preserve their functionality. Additionally, through normal usage of service cart 103, trace amounts of air originating from sources external to the fluid conduits may be found within the fluid conduits.

RID 401 comprises sensitive electronics and other components. Thus it is important to minimize the contaminants within the refrigerant during the identification, both to ensure accurate identification of the refrigerant and purity thereof, but also to protect the components of RID 401. For this reason, a protective orifice 407 is fitted across RID conduit 405 to minimize the transfer of any non-refrigerant material between RID 401 and main manifold 301. Orifice 407 comprises a "pinhole" design to accomplish this filtration, by providing a passageway that is primarily traversable by refrigerant, but not oil or other impurities within the refrigerant.

Because orifice 407 comprises such a small passageway, over repeated normal use of service cart 103 oil or other contaminants may cause obstruction to the passageway, rendering the sampling and identification of the refrigerant less efficient and more time-consuming. In order to accommodate for these potential blockages of orifice 407, solenoid 403 can be subjected to one or more controlled opening actions after the refrigerant has been removed from RID 401 and RID conduit 405. The controlled opening of solenoid 403 can induce a pressure gradient between RID 401 and the conduits within main manifold 301 near the end of the recovery phase because the pressure inside main manifold 301 is still close to vacuum. Normal atmospheric pressure from outside of RID 401 can be induced to create the pressure gradient by permitting a small amount of air 408 into RID 401 through an RID filter 409. RID filter 409 is designed to permit airflow, but contain other external contaminants from entering RID 401. This pressure gradient can be utilized to exert pressure across orifice 407 in the direction of solenoid 403 in the event that there is an obstruction or partial obstruction of orifice 407. If there is no obstruction, a small amount of atmospheric air may enter the fluid conduits, but excess air can be purged from the system after the end of recovery using a conventional air purge mechanism of storage tank 207 (see FIG. 2; FIG. 3).

The timing of the opening actions of solenoid 403 can be controlled to optimize the pressure gradient used to purge or clear orifice 407 while simultaneously minimizing the introduction of external air into the fluid conduits. In the depicted embodiment, solenoid 403 may undergo a predetermined number of opening actions punctuated by closings of solenoid 403. After the opening action, solenoid 403 may remain open for a predetermined window of time for each of the opening actions. By way of example, and not limitation, solenoid 403 may be subjected to between 2 and 5 opening actions during the recovery after the identification has been completed, and each of the opening actions may be followed by a predetermined window of time lasting 3 to 7 seconds. In the depicted embodiment, solenoid 403 may undergo 3 opening actions, with each opening action lasting for a predetermined window of 5 seconds, but other embodiments may comprise other arrangements or configurations without deviating from the teachings disclosed herein. In the depicted embodiment, each of the opening actions is followed by a window of time that is identical to all the other windows of time for the solenoid 403 to remain open, but other embodiments may exhibit different predetermined windows of time for one or more opening actions without deviating from the teachings disclosed herein. Different embodiments may utilize a different number of opening actions or durations of time windows to best optimize for a particular type of refrigerant or a particular type of oil used by a service cart without deviating from the teachings disclosed herein.

In the depicted embodiment, the control of solenoid 403 may be accomplished by a processor associated with the service cart. The processor (not shown) of service cart 103 (see FIG. 1; FIG. 2) may execute instructions stored upon a non-transitory computer-readable medium (not shown) associated with the service cart, such as a memory in data communication with the processor.

Figure 5:
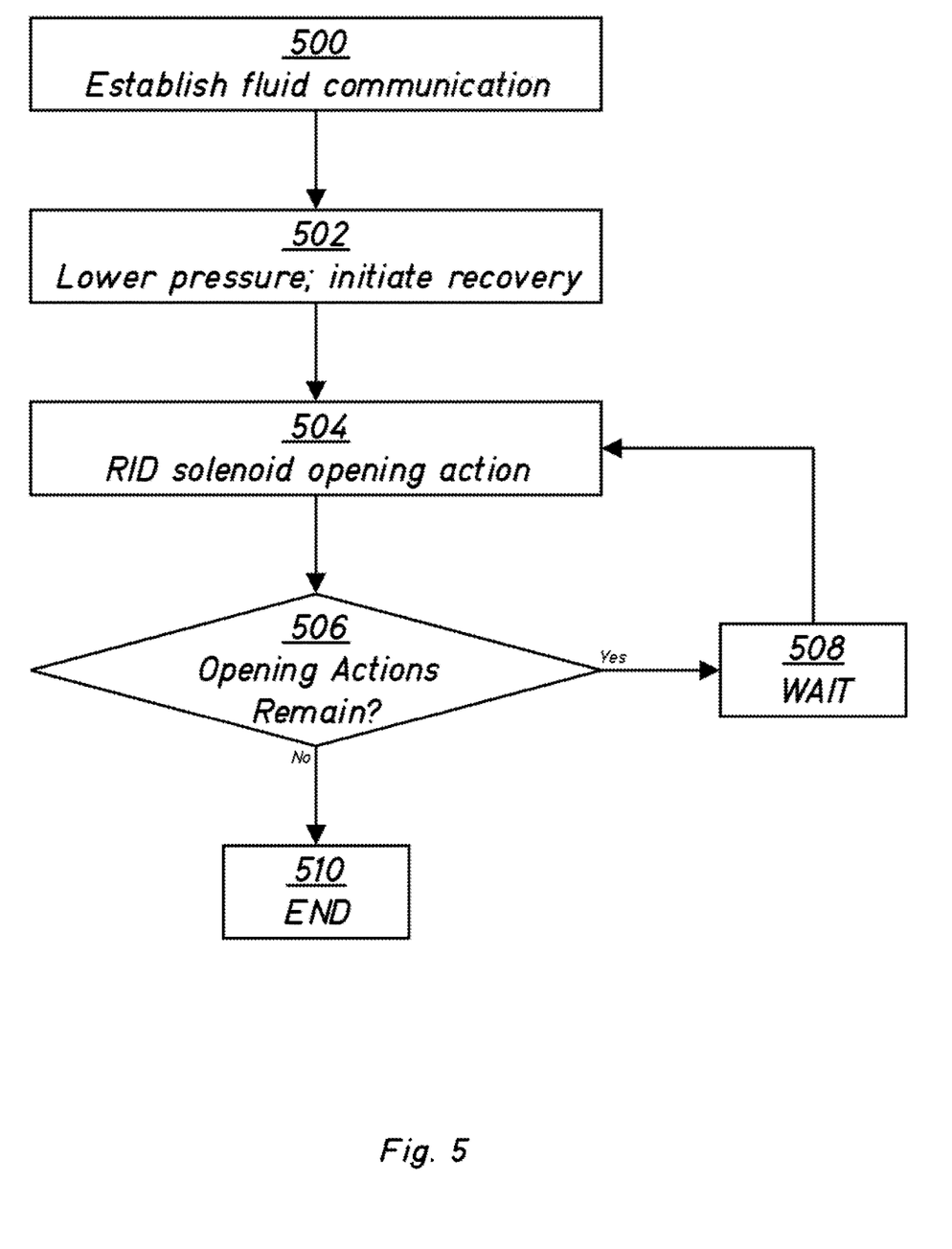
FIG. 5 is a flowchart illustrating a method of clearing an orifice of a refrigerant identification branch of a refrigerant flow circuit according to one embodiment of the teachings disclosed herein.

FIG. 5 is a flowchart illustrating a method of executing opening actions for a solenoid (such as solenoid 403; see FIG. 4) separating a refrigerant identification (RFID) branch (such as RFID branch 350; see FIG. 3, FIG. 4) from other fluid conduits (such as main manifold 301; see FIG. 3, FIG. 4) of a fluid exchange device, such as a service cart (such as service cart 103; see FIG. 1. FIG. 2) during operation of a service action for a vehicle (such as vehicle 102; see FIG. 1).

The process begins at step 500 where fluid communication between the vehicle and the service cart. Fluid communication is established by connecting hoses (such as hoses 105; see FIG. 1) between ports of the service cart (such as ports 205; see FIG. 2) and ports of the air conditioning system of the vehicle. In some embodiments, fluid communication may be additionally established by opening solenoids within the fluid circuit of the service cart that control flow of material from the ports to other elements of the circuit.

Once fluid communication is established at step 500, the method proceeds to step 502, where the pressure within the fluid conduits of the service cart is reduced, either by a pump (such as vacuum pump 307; see FIG. 3) or a compressor (such as compressor 311; see FIG. 3). The reduction in pressure within the fluid conduits of the service cart cause a pressure differential between the service cart and the vehicle that initiates the recovery of transfer from the vehicle into a tank of the service cart (such as tank 207; see FIG. 2). After a period of time during recovery, the method proceeds to step 504 where a solenoid associated with a refrigerant identifier (RID) undergoes an opening action. In the depicted embodiment, this opening action of the solenoid (referred to as the "RID solenoid" for clarity) may be utilized to draw refrigerant into the RID for sampling and identification, or it may occur after a sampling and identification sub-step without deviating from the teachings disclosed herein. After the RID solenoid is closed, the method proceeds to step 506 where it is determined if any additional opening actions of the RID solenoid are planned. Repeated opening actions can be used to provide additional maintenance or protective functions of the service cart, such as clearing a potentially obstructed orifice (such as orifice 407; see FIG. 4). If additional opening actions are planned, the method proceeds to step 508 and waits for a predetermined window of time before returning to step 504 to open the RID solenoid again. In the depicted embodiment, each iteration of step 504 may involve opening the RID solenoid for the same duration of time, but other embodiments may comprise other arrangements without deviating from the teachings disclosed herein.

Once the total predetermined number of opening actions have been executed for the RID solenoid at step 506, the method proceeds to step 510 and ends.

Figure 6:
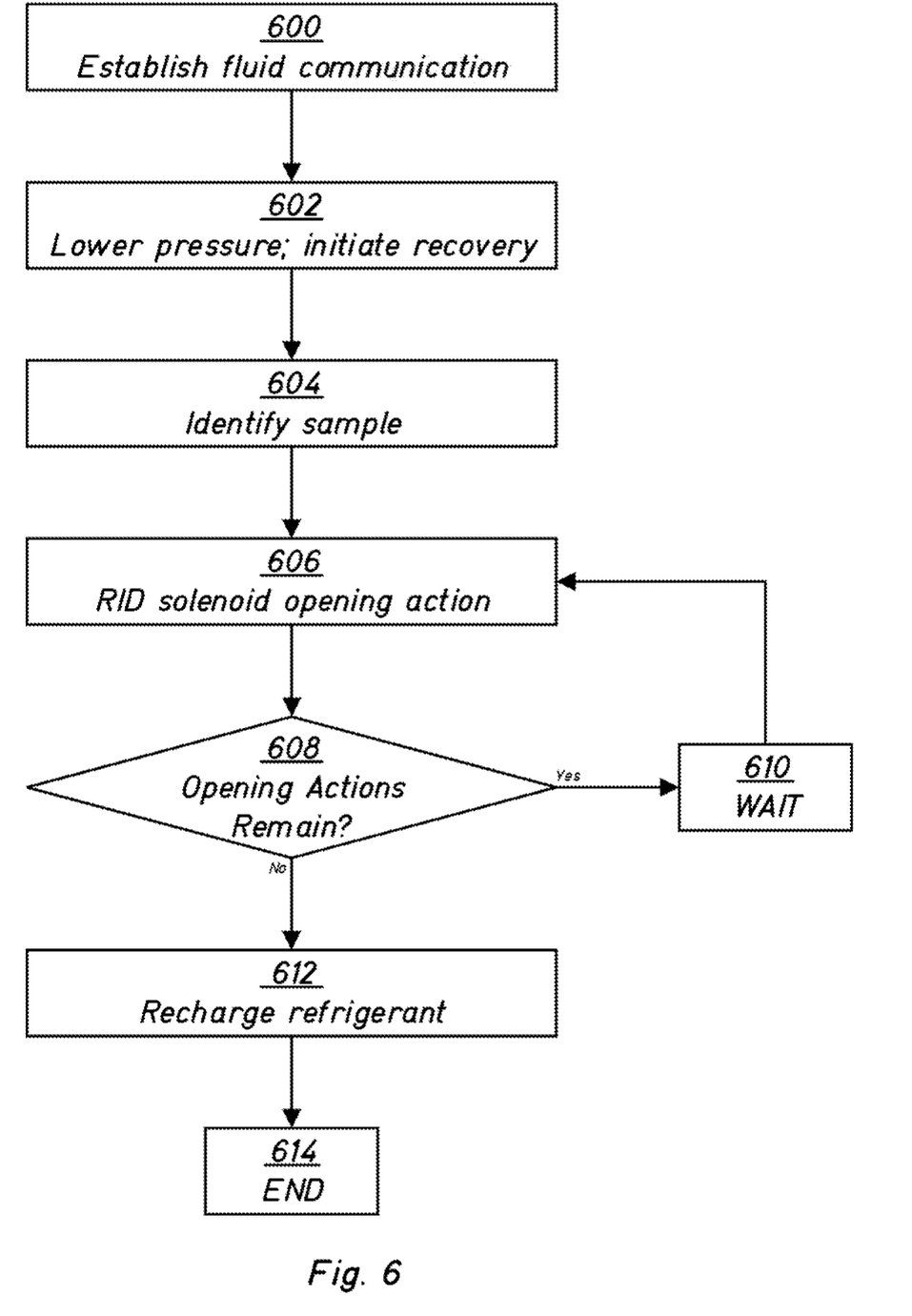
FIG. 6 is a flowchart illustrating a method of refrigerant recovery and recharge according to an embodiment of the teachings disclosed herein.

FIG. 6 is a flowchart illustrating a method of refrigerant recovery and recharging between a service device (such as service cart 103; see FIG. 1, FIG. 2) and a vehicle (such as vehicle 102; see FIG. 2).

FIG. 5 is a flowchart illustrating a method of executing opening actions for a solenoid (such as solenoid 403; see FIG. 4) separating a refrigerant identification (RFID) branch (such as RFID branch 350; see FIG. 3, FIG. 4) from other fluid conduits (such as main manifold 301; see FIG. 3, FIG. 4) of a fluid exchange device, such as a service cart (such as service cart 103; see FIG. 1, FIG. 2) during operation of a service action for a vehicle (such as vehicle 102; see FIG. 1).

The process begins at step 600 where fluid communication between the vehicle and the service device. Fluid communication may be established by connecting hoses (such as hoses 105; see FIG. 1) between ports of the service cart (such as ports 205; see FIG. 2) and ports of the air conditioning system of the vehicle. In some embodiments, fluid communication may be established by opening solenoids within the fluid circuit of the service cart that control flow of material from the ports to other elements of the circuit.

Once fluid communication is established at step 600, the method proceeds to step 602, where the pressure within the fluid conduits of the service cart is reduced, either by a pump (such as vacuum pump 307; see FIG. 3) or a compressor (such as compressor 311; see FIG. 3). The reduction in pressure within the fluid conduits of the service cart cause a pressure differential between the service cart and the vehicle that initiates a recovery of refrigerant from the vehicle into a tank of the service device (such as tank 207; see FIG. 2).

After a period of time during recovery, the method proceeds to step 604 where an identification sub-process is executed. During the identification sub-process, a solenoid associated with a component acting as a refrigerant identifier (RID) of the service device opens for a first window of time to permit a sample-sized quantity of refrigerant to enter an RID branch (such as RID branch 350; see FIG. 3, FIG. 4) of the service device. This solenoid may be referred to as an "RID" solenoid for clarity. During this phase of recovery, the pressure inside the RID branch is lower than within the fluid conduits of the vehicle, and refrigerant flows through the RID branch into the RID. During this transfer for sampling, the refrigerant passes through a protective orifice (such as orifice 407; see FIG. 4), which is configured to prevent oil, debris, air, or other contaminants from entering the RID. After the RID completes an identification or purity assessment of the refrigerant, the RID solenoid is opened again, and a pressure gradient is created between the RID and the storage tank of the service device, expelling the refrigerant from the RID branch.

Once the refrigerant is expelled from the RID branch, the protective orifice may be obstructed or clogged by non-refrigerant material within the fluid conduits of the service device. To compensate for this, the method proceeds to step 606, to initiate an iterative clearing sub-process. The clearing begins by executive an opening action for the RID solenoid, wherein the RID solenoid is opened while the fluid conduit of the service device is still experiencing very low pressure. This very low pressure creates a pressure differential between the RID branch and the external environment, and the creates a controlled flow of air through the protective orifice toward the fluid conduit of the service device. The opening action comprises opening the RID solenoid and maintaining the open state thereof for a predetermined window of time. In the depicted embodiment, the predetermined window of time may be between 2 and 5 seconds, such as a 3-second window. The predetermined window of time is selected to permit some air to move through the protective orifice for clearing, but not so much as to add more air into the fluid conduit than can be purged within normal operations of the storage tank. After the predetermined window of time has expired, the solenoid is closed.

The method then proceeds to step 608. In order to optimize the clearing of the protective orifice, additional opening actions may be desired. If additional opening actions are planned, the method proceeds to step 610 and waits for a predetermined window of time before returning to step 606 to open the RID solenoid again. In the depicted embodiment, each iteration of step 606 may involve opening the RID solenoid for the same duration of time, but other embodiments may comprise other arrangements without deviating from the teachings disclosed herein. After a desired number of opening action iterations have been completed, the storage tank may be purged of air introduced to the fluid conduits by the opening actions of the RID solenoid.

Once the total predetermined number of opening actions have been executed for the RID solenoid at step 608, the method proceeds to step 612, where a pressure gradient is established within the fluid conduits of the service device such that the pressure is higher within the service device than within the fluid conduits of the vehicle. This pressure gradient causes refrigerant to flow from the storage tank back into the fluid conduits of the vehicle in a recharge process. The recharge is monitored based upon the weight of the storage tank. When a specified quantity of refrigerant has been recharged into the vehicle, the method can proceed to step 614 and end. The specified quantity of the refrigerant for recharge is specified by the manufacturer of the vehicle air conditioning system, and will vary based upon make and model of the vehicle.

Operation of the method of FIG. 6 can also be controlled autonomously by a processor executing instructions stored upon a non-transitory computer-readable medium.

In the depicted embodiment, the processor may be embodied as a specialized processor of the service device, but other embodiments may comprise other configurations without deviating from the teachings disclosed herein. The processor may be embodied as a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art.

In the depicted embodiment, the non-transitory computer-readable medium may be embodied as a memory of the service device in data communication with the specialized processor, but other embodiments may comprise other configurations without deviating from the teachings disclosed herein. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A refrigerant exchange method comprising:
    establishing fluid communication between a service cart and a refrigerant circuit of a vehicle, the fluid communication comprising a high-side connection and a low-side connection;
    lowering the fluid pressure within the fluid communication such that refrigerant within the refrigerant circuit is directed toward a reservoir of the service cart for a recovery process; and
    opening a solenoid associated with a refrigerant identification (RID) branch of the service cart a predetermined plurality of times while the refrigerant circuit experiences lowered fluid pressure during the recovery process; and
    closing the solenoid after a predetermined window of time for each of the plurality of opening actions of the solenoid,
    wherein the predetermined plurality of opening actions and the predetermined windows of time are selected to purge an orifice associated with the RID branch.

2. The refrigerant exchange method of claim 1, wherein the solenoid is subjected to between 2 and 5 opening actions during the recovery.

3. The refrigerant exchange method of claim 2, wherein the solenoid is subjected to 3 opening actions during the recovery.

4. The refrigerant exchange method of claim 1, wherein the predetermined window is the same amount of time for each of the corresponding opening actions of the solenoid.

5. The refrigerant exchange method of claim 1, wherein the predetermined window of time comprises a different amount of time for at least one of the plurality of opening actions of the solenoid.

6. The refrigerant exchange method of claim 1, wherein the solenoid is opened for a predetermined window of time comprises 3-7 seconds during the recovery.

7. The refrigerant exchange method of claim 6, wherein each of the number of opening actions lasts for a window of 5 seconds during the recovery.

8. The refrigerant exchange method of 7, wherein the solenoid is subjected to 3 opening actions during the recovery.

9. A refrigerant exchange method comprising:
    establishing fluid communication between a service cart and a refrigerant circuit of a vehicle, the fluid communication comprising a high-side connection and a low-side connection;
    lowering the fluid pressure within the fluid communication such that refrigerant within the refrigerant circuit is directed toward a reservoir of the service cart for a recovery process;
    opening a solenoid associated with a refrigerant identification (RID) branch of the service cart while the refrigerant is recovering into the reservoir for a first window of time, such that the RID branch of the service cart accumulates a sample quantity of refrigerant;
    closing the solenoid;
    opening the solenoid a predetermined plurality of times while the refrigerant circuit experiences lowered fluid pressure during the recovery process;
    closing the solenoid after a predetermined window of time for each of the plurality of opening actions of the solenoid;
    establishing a pressure differential between the service cart and the refrigerant circuit such that refrigerant is directed toward the refrigerant circuit of the vehicle from the reservoir in a recharge process; and
    discontinuing the pressure differential after a quantity of refrigerant specified for the vehicle has been recharged into the refrigerant circuit from the reservoir,
    wherein the predetermined plurality of opening actions and the predetermined windows of time are selected to purge an orifice associated with the RID branch.

10. The refrigerant exchange method of claim 9, wherein the solenoid is subjected to between 2 and 5 opening actions during the recovery.

11. The refrigerant exchange method of claim 10, wherein the solenoid is subjected to 3 opening actions during the recovery.

12. The refrigerant exchange method of claim 9, wherein the predetermined window is the same amount of time for each of the corresponding opening actions of the solenoid.

13. The refrigerant exchange method of claim 9, wherein the predetermined window of time comprises a different amount of time for at least one of the plurality of opening actions of the solenoid.

14. The refrigerant exchange method of claim 9, wherein the solenoid is opened for a predetermined window of time comprises 3-7 seconds during the recovery.

15. The refrigerant exchange method of claim 14, wherein each of the number of opening actions lasts for a window of 5 seconds during the recovery.

16. The refrigerant exchange method of 15, wherein the solenoid is subjected to 3 opening actions during the recovery.

17. A non-transitory computer-readable medium storing instructions thereon that, when executed by a processor associated with a service cart, cause the processor to perform the steps of:
    establishing fluid communication between the service cart and a refrigerant circuit of a vehicle, the fluid communication comprising a high-side connection and a low-side connection;
    lowering the fluid pressure within the fluid communication such that refrigerant within the refrigerant circuit is directed toward a reservoir of the service cart for a recovery process;
    opening a solenoid associated with a refrigerant identification (RID) branch of the service cart while the refrigerant is recovering into the reservoir for a first window of time, such that the RID branch of the service cart accumulates a sample quantity of refrigerant;
    closing the solenoid;

opening the solenoid a predetermined plurality of times while the refrigerant circuit experiences lowered fluid pressure during the recovery process;

closing the solenoid after a predetermined window of time for each of the plurality of opening actions of the solenoid;

establishing a pressure differential between the service cart and the refrigerant circuit such that refrigerant is directed toward the refrigerant circuit of the vehicle from the reservoir in a recharge process; and discontinuing the pressure differential after a quantity of refrigerant specified for the vehicle has been recharged into the refrigerant circuit from the reservoir, wherein the predetermined plurality of opening actions and the predetermined windows of time are selected to purge an orifice associated with the RID branch.

18. The refrigerant exchange method of claim 17, wherein the predetermined window of time comprises a different amount of time for at least one of the plurality of opening actions of the solenoid.

19. The refrigerant exchange method of claim 17, wherein each of the number of opening actions lasts for a window of 5 seconds during the recovery.

20. The refrigerant exchange method of 19, wherein the solenoid is subjected to 3 opening actions during the recovery.

* * * * *